(12) United States Patent
Chen et al.

(10) Patent No.: US 8,824,172 B2
(45) Date of Patent: Sep. 2, 2014

(54) APPARATUS AND METHOD FOR STANDBY POWER REDUCTION OF A FLYBACK POWER CONVERTER

(75) Inventors: Sheng-Hua Chen, Sanchong (TW); Tzu-Chen Lin, Taipei (TW); Pei-Lun Huang, Zhubei (TW)

(73) Assignee: Richpower Microelectronics Corporation, Grand Cayman (KY)

( * ) Notice: Subject to any disclaimer, the term of this patent is extended or adjusted under 35 U.S.C. 154(b) by 658 days.

(21) Appl. No.: 12/852,628

(22) Filed: Aug. 9, 2010

(65) Prior Publication Data

US 2011/0051463 A1 Mar. 3, 2011

(30) Foreign Application Priority Data

Aug. 14, 2009 (TW) ................... 098127380

(51) Int. Cl.
*H02M 3/335* (2006.01)
*H02M 1/00* (2006.01)

(52) U.S. Cl.
CPC ............ *H02M 3/33507* (2013.01); *Y02B 70/16* (2013.01); *H02M 2001/0032* (2013.01)
USPC .................... 363/21.15; 363/21.12; 363/21.16

(58) Field of Classification Search
USPC ............... 363/21.12–21.13, 21.15–21.17; 323/220, 229, 231
See application file for complete search history.

(56) References Cited

U.S. PATENT DOCUMENTS

| | | | | |
|---|---|---|---|---|
| 4,868,730 A * | 9/1989 | Ward | ......................... | 363/21.12 |
| 6,160,720 A * | 12/2000 | Nishida et al. | .................. | 363/19 |
| 6,445,598 B1 * | 9/2002 | Yamada | ..................... | 363/21.12 |
| 6,646,894 B2 * | 11/2003 | Hong et al. | ................ | 363/21.01 |
| 6,922,345 B2 * | 7/2005 | Nishida et al. | ............. | 363/21.16 |
| 6,980,444 B2 * | 12/2005 | Takahashi | .................. | 363/21.18 |
| 7,035,119 B2 * | 4/2006 | Koike | ............. | 363/19 |
| 7,064,966 B2 * | 6/2006 | Yamada et al. | ............ | 363/21.16 |
| 8,102,679 B2 * | 1/2012 | Gong et al. | ................ | 363/21.12 |
| 8,274,268 B2 * | 9/2012 | Yen | ............................. | 323/282 |
| 2005/0099165 A1 * | 5/2005 | Tani | ............................. | 323/267 |
| 2005/0248325 A1 * | 11/2005 | Adachi | ........................ | 323/273 |
| 2005/0281062 A1 * | 12/2005 | Choi et al. | ................ | 363/21.08 |
| 2006/0093017 A1 * | 5/2006 | Gong et al. | ..................... | 375/134 |
| 2010/0039836 A1 * | 2/2010 | Gong et al. | ................ | 363/21.13 |
| 2010/0321957 A1 * | 12/2010 | Sha et al. | ........................ | 363/20 |

* cited by examiner

*Primary Examiner* — Gary L Laxton
*Assistant Examiner* — Henry Lee, III
(74) *Attorney, Agent, or Firm* — Muncy, Geissler, Olds & Lowe, P.C.

(57) ABSTRACT

An apparatus and method for a flyback power converter reduce the standby output voltage of the flyback power converter by switching the reference voltage provided by a shunt regulator of the flyback power converter or the ratio of voltage divider resistors of the shunt regulator, to reduce the standby power consumption by an output feedback circuit of the flyback power converter, the shunt regulator, and the voltage divider resistors, and thereby improve the power loss of the flyback power converter in standby mode.

6 Claims, 5 Drawing Sheets

APPARATUS AND METHOD FOR STANDBY POWER REDUCTION OF A FLYBACK POWER CONVERTER

FIELD OF THE INVENTION

The present invention is related generally to a power converter and, more particularly, to an apparatus and method for standby power reduction of a flyback power converter.

BACKGROUND OF THE INVENTION

As shown in FIG. 1, a flyback power converter for power supply applications includes a transformer Tx connected between a primary circuit 10 and a secondary circuit 12, the primary circuit 10 uses a controller 14 to switch a power switch 16 to control the primary current of the transformer Tx, and when the power switch 16 is turned off, the transformer Tx delivers energy to the secondary side to charge a capacitor C to supply a load current Io. In the secondary circuit 12, an output feedback circuit 18, for example, the photo-coupler shown in FIG. 1, is connected to the output Vo for output feedback, a shunt regulator 20 has a cathode K connected to the photo-coupler 18 to control the current Id of the light-emitting diode (LED) in the photo-coupler 18, and resistors R1 and R2 are connected in series between the output Vo and a ground of the flyback power converter. The resistor R2 has an end connected to the reference end R of the shunt regulator 20, thereby scaling the output voltage of the flyback power converter to $$Vo=VR \times [(R1+R2)/R2]=VR \times [1+(R1/R2)], \quad [\text{Eq-1}]$$

where VR is the reference voltage provided by the shunt regulator 20. Assuming that the resistances between the output Vo of the flyback power converter and the two ends of the LED in the photo-coupler 18 are R3 and R4, respectively, the LED current flowing from the output Vo to the photo-coupler 18 will be $$Id=[Vo-(VK+1.1)]/R3, \quad [\text{Eq-2}]$$

the bias current flowing from the output Vo to the bias point K will be $$Ibias=(Vo-VK)/R4, \quad [\text{Eq-3}]$$

and the voltage divider current flowing from the output Vo to the resistors R1 and R2 will be $$Ir=Vo/(R1+R2). \quad [\text{Eq-4}]$$

When the system enters a standby mode, even the load current Io decreases to very low, the output voltage Vo of the flyback power converter still remains unchanged and as a result, as shown by the equations Eq-2 to Eq-4, the currents Id, Ibias, and Ir in the standby mode are the same as in normal operation. In other words, the photo-coupler 18, the shunt regulator 20, and the resistors R1, R2, R3, R4 consume considerable power even in standby mode, thus incurring excessive loss of standby power of the flyback power converter.

SUMMARY OF THE INVENTION

An object of the present invention is to provide an apparatus for standby power reduction of a flyback power converter.

An object of the present invention is to provide a method for standby power reduction of a flyback power converter.

According to the present invention, an apparatus and method for a flyback power converter reduce the standby output voltage of the flyback power converter by switching the reference voltage provided by a shunt regulator of the flyback power converter, to reduce the standby power consumption by an output feedback circuit of the flyback power converter, the shunt regulator, and voltage divider resistors.

According to the present invention, an apparatus and method for a flyback power converter reduce the standby output voltage of the flyback power converter by switching the ratio of voltage divider resistors of a shunt regulator of the flyback power converter, to reduce the standby power consumption by an output feedback circuit of the flyback power converter, the shunt regulator, and the voltage divider resistors.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
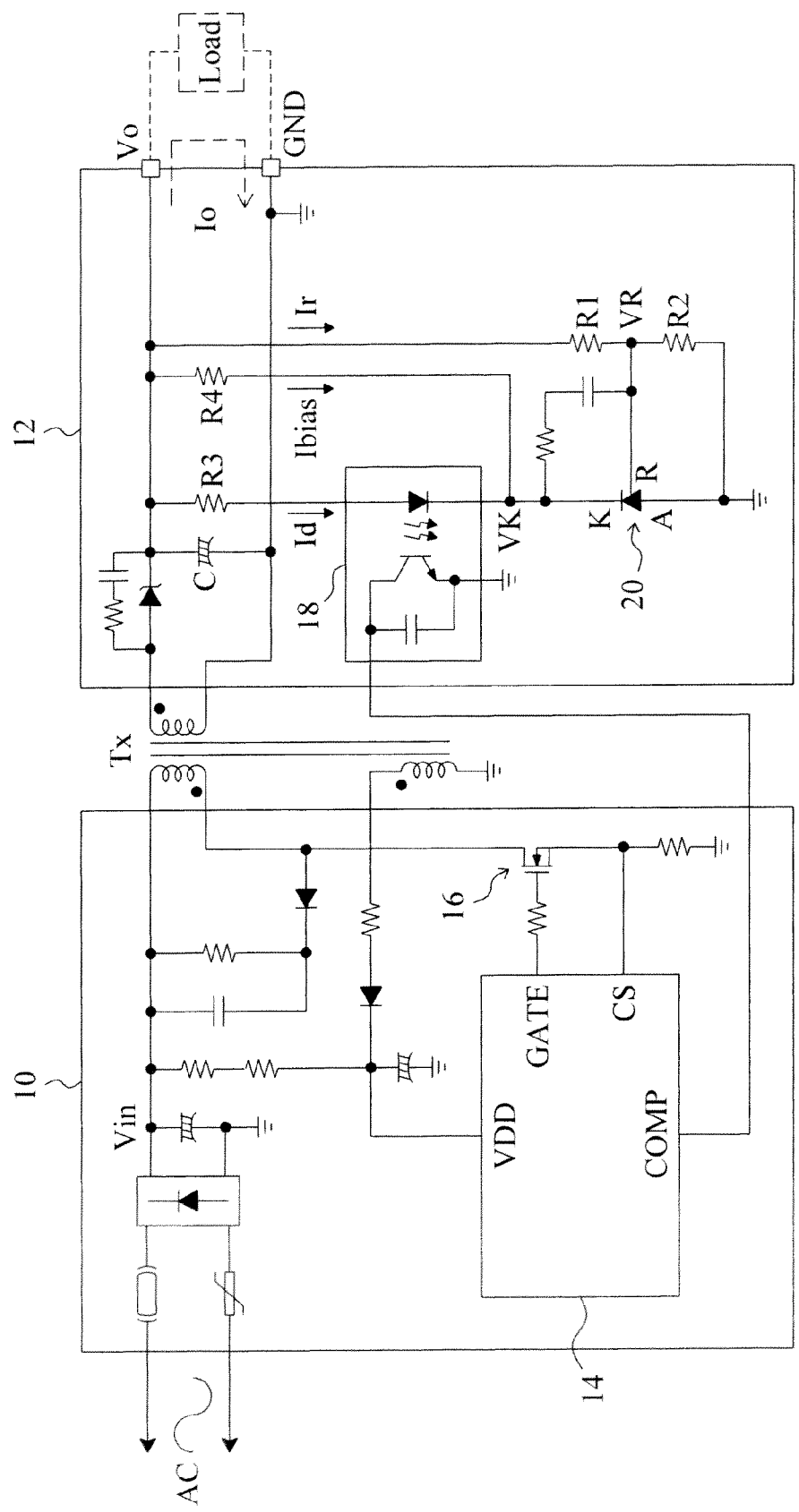
FIG. 1 is a circuit diagram of a conventional flyback power converter.
Figure 2:
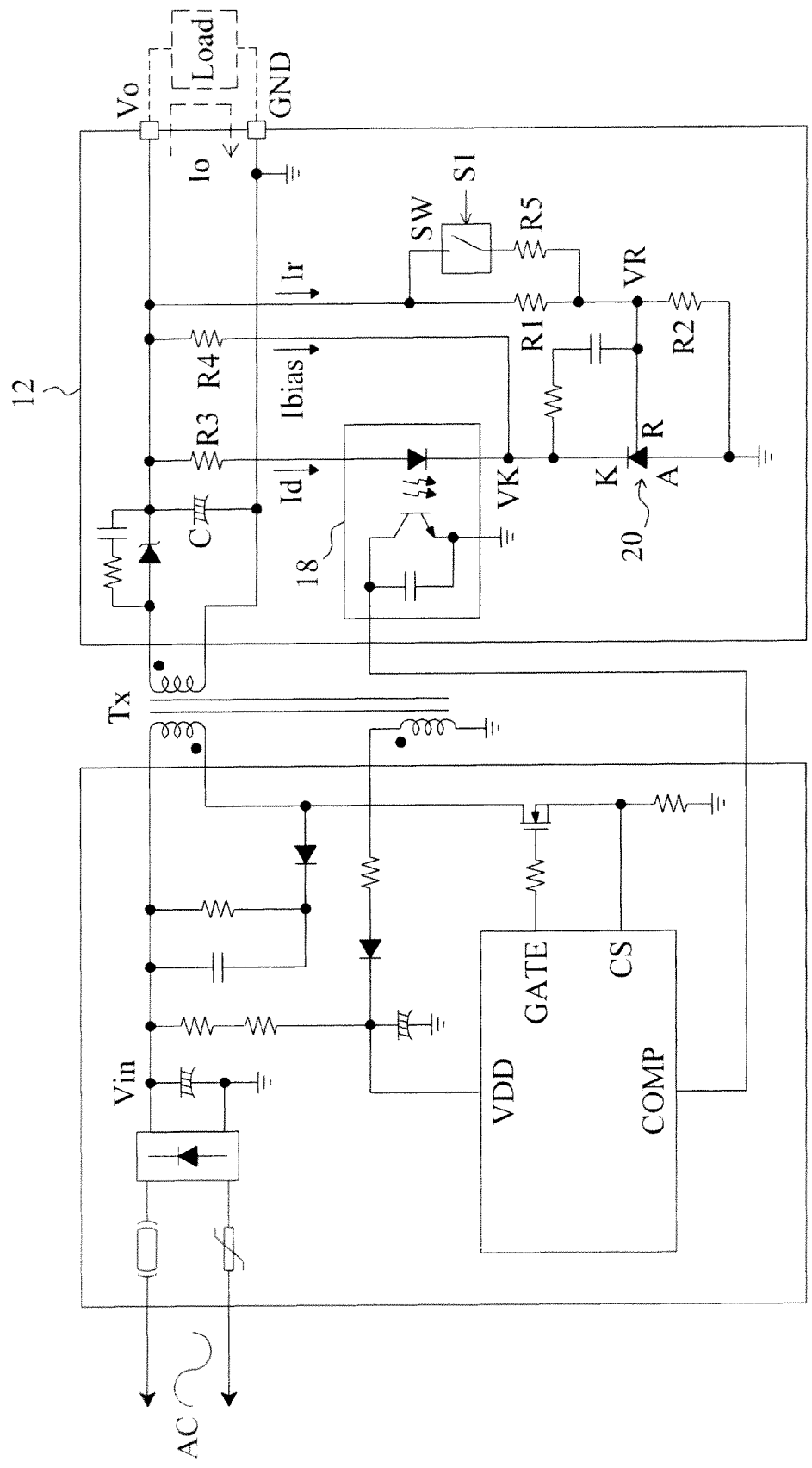
FIG. 2 is a circuit diagram of a first embodiment according to the present invention.

FIG. 2 is a circuit diagram of a first embodiment according to the present invention, which is designed with the same circuit structure as that of the conventional flyback power converter shown in FIG. 1 for illustrating the scope and features of the present invention, and has a switch-resistor network connected in parallel to the resistor R1. This added switch-resistor network includes a switch SW and a resistor R5 connected in series, and the switch SW is controlled by a sleep mode signal S1. The combination of the resistor R1 and the switch-resistor network has an equivalent resistance Req and thus the output voltage $$Vo=VR \times ((Req+R2)/R2)=VR \times (1+(Req/R2)). \quad [\text{Eq-5}]$$

The ratio of the output voltage Vo to the reference voltage VR is determined by the voltage dividing ratio of the voltage divider established the equivalent resistor Req and the resistor R2. In normal operation, the switch SW is open and thus Req=R1. When the system enters a standby mode, the sleep mode signal S1 closes the switch SW and in consequence, the resistor R5 is parallel connected to the resistor R1, thereby reducing the equivalent resistance Req and as a result, the output voltage Vo decreases, as shown by the equation Eq-5. As shown by the equations Eq-2 and Eq-3, when Vo decreases, the currents Id and Ibias both decrease, that is, the power consumption by each of the photo-coupler 18, the shunt regulator 20, and the resistors R3, R4 is reduced. Moreover, even the current $$Ir=VR/R2 \quad [\text{Eq-6}]$$

remains unchanged, the power consumption by the equivalent resistance Req is reduced since Req is reduced.

Figure 3:
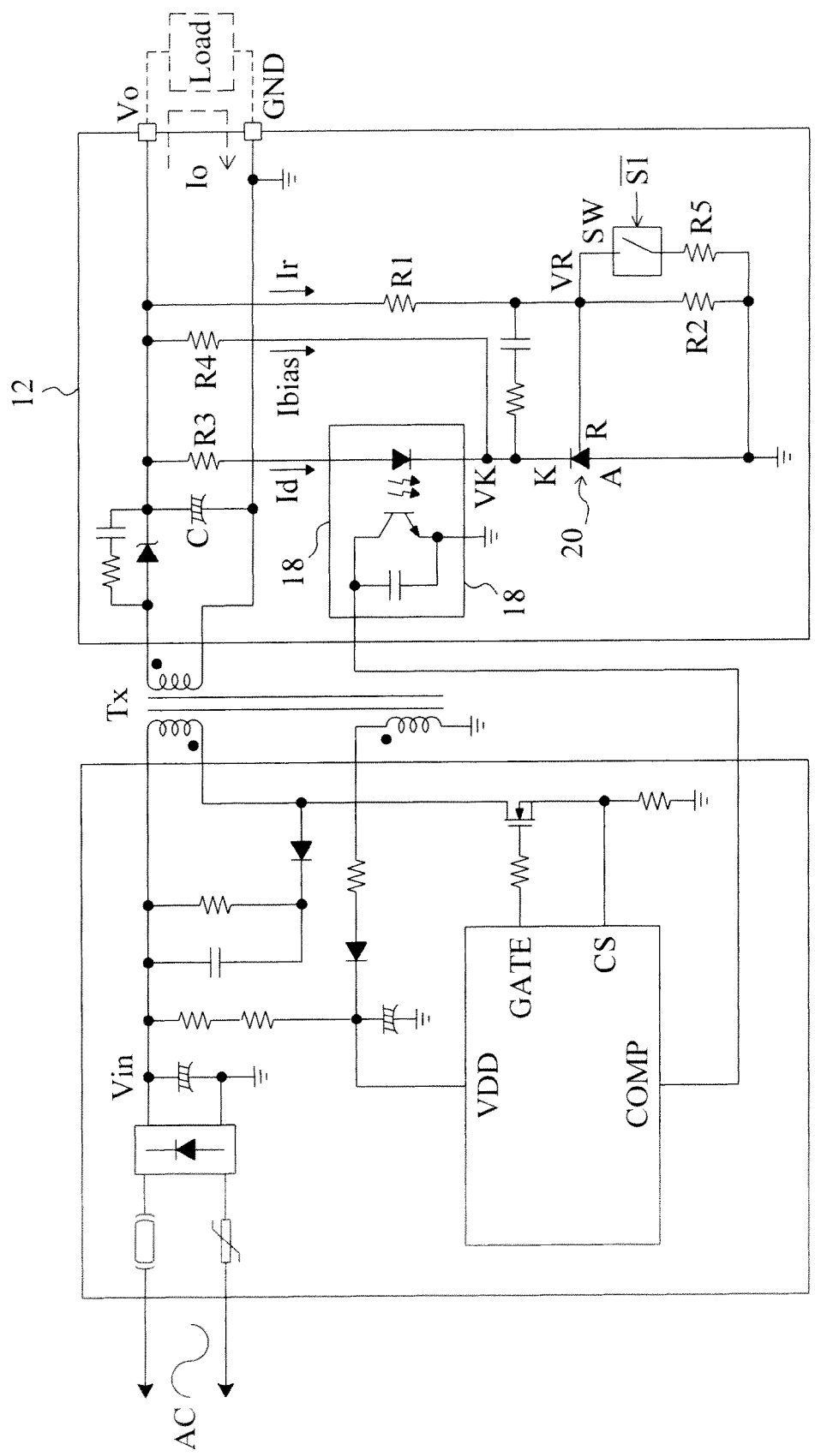
FIG. 3 is a circuit diagram of a second embodiment according to the present invention.

Based on the same principle, the apparatus for standby power reduction of a flyback power converter can be modified to have the switch-resistor network parallel connected to the resistor R2, and the control signal of the switch SW to be $\overline{S1}$ which is an inversion of the sleep mode signal S1, as shown in FIG. 3. In this embodiment, the switch SW is closed in normal operation and open in standby mode. Therefore, the equivalent resistance Req of the combination of the resistor R2 and the switch-resistor network is higher in standby mode than in normal operation. In this case, the equation Eq-5 can be rewritten as $$Vo=VR\times((Req+R2)/R2)=VR\times(1+(R1/Req)). \quad [\text{Eq-7}]$$

Since the reference voltage VR is fixed, the standby output voltage Vo decreases as Req increases. When the standby output voltage Vo decreases, all the currents Id, Ibias, and Ir turn low, that is, the power consumption by each of the photocoupler 18, the shunt regulator 20, and the resistors R1, R2, R3, R4 is reduced.

Figure 4:
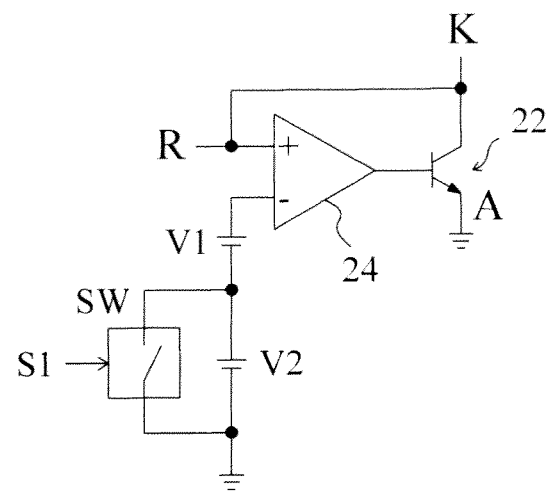
FIG. 4 is a circuit diagram of a third embodiment according to the present invention.

In the aforesaid two embodiments, it is by switching the resistance of the voltage divider resistors to change the ratio of the output voltage Vo to the reference voltage VR to thereby reduce the output voltage Vo in standby mode, whereas the embodiment shown in FIG. 4 reduces the standby output voltage Vo_standby by switching the reference voltage VR of the shunt regulator 20. In this embodiment, the shunt regulator includes a bipolar junction transistor (BJT) 22 and an operational amplifier 24. The collector and the emitter of the BJT 22 serve as the cathode K and the anode A of the shunt regulator 20, respectively, and the base of the BJT 22 is connected to the output of the operational amplifier 24. The operational amplifier 24 has a positive input as the reference end R of the shunt regulator 20, and a negative input coupled to serially connected voltage sources V1 and V2. The switch SW is connected in parallel to the voltage source V2 and controlled by the sleep mode signal S1. In normal operation, the switch SW is open and thus the operational amplifier 24 has a reference voltage of V1+V2, thereby setting the voltage VR at the reference end R of the shunt regulator 20 at V1+V2. When the system enters a sleep mode, the switch SW is closed by the sleep mode signal S1 and thus the reference voltage VR of the operational amplifier 24 drops to V1. It can be known from the equation Eq-1 that a decrease in the reference voltage VR causes the output voltage Vo of the flyback power converter to decrease. In some other embodiments, only the voltage source V2 is used, i.e. V1=0, and consequently the reference voltage VR in standby mode as well as the standby output voltage Vo_standby is zero, thus further reducing the standby power consumption. In some embodiments, the switch SW is connected in parallel to the voltage source V1 instead.

Figure 5:
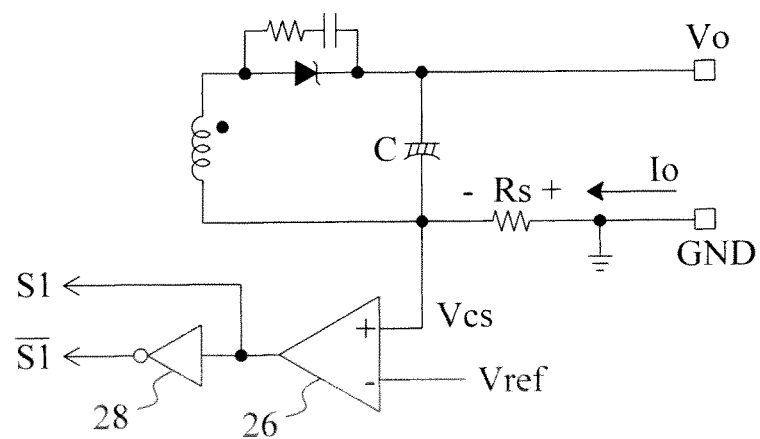
FIG. 5 is a circuit diagram of an embodiment for providing a sleep mode signal.

If the system itself has no signals available for the sleep mode signal S1, it can be generated by an additional circuit, for example shown in FIG. 5, which includes a current sense resistor Rs in the current path of the load current Io to generate a current sense voltage Vcs, and a comparator 26 to compare the current sense voltage Vcs with a threshold value Vref to generate the sleep mode signal S1, or an inverter 28 to invert the sleep mode signal S1 to be the signal $\overline{S1}$. The threshold value Vref is negative. In normal operation, the load current Io is large, and the current sense voltage Vcs is lower than the threshold value Vref; as a result, the sleep mode signal S1 is low. In standby mode, however, the load current Io is small and thus renders the current sense voltage Vcs higher than the threshold value Vref, such that the sleep mode signal S1 is high.

Figure 6:
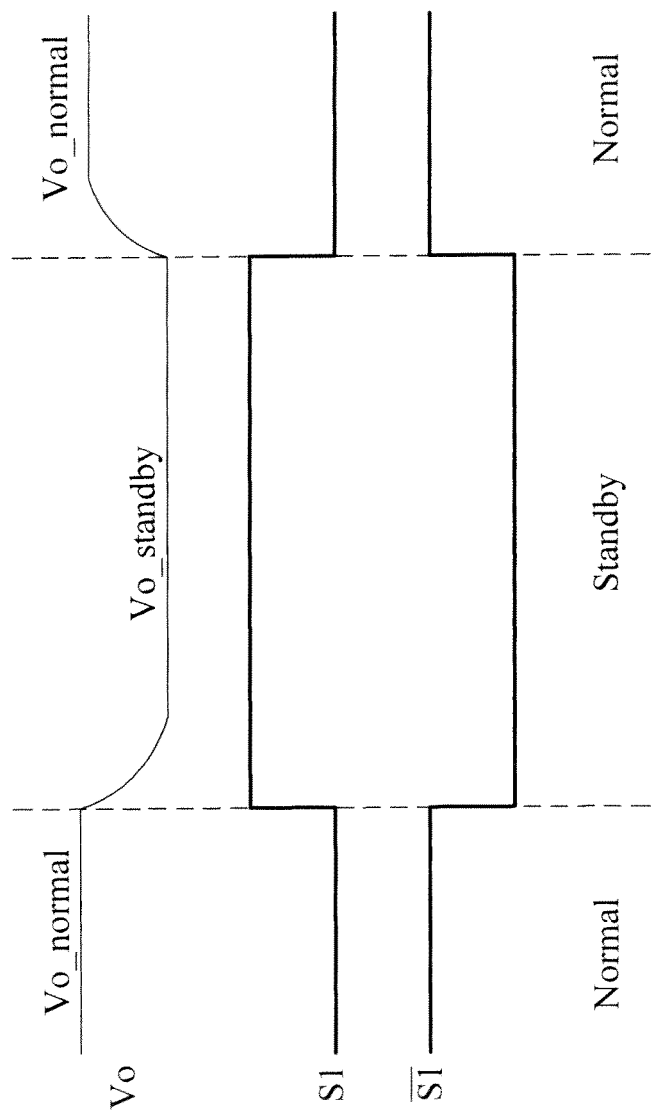
FIG. 6 is a timing diagram of a sleep mode signal and an output voltage.

FIG. 6 is a timing diagram of the sleep mode signal S1 and the output voltage Vo. In normal operation, the sleep mode signal S1 is low and the output voltage Vo stays at a normal value Vo_normal. Once the system enters a sleep mode, the sleep mode signal S1 is asserted and therefore the output voltage Vo is reduced to a standby output voltage Vo_standby. In some applications, the standby output voltage Vo_standby is zero, and in some other applications, the standby output voltage Vo_standby is sufficient to sustain the operation of certain devices. For example, in display applications, it is necessary to keep the image scalar in operation so as to issue instructions for waking up the system in future. In this instance, the standby output voltage Vo_standby is high enough to sustain the operation of the image scalar.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for standby power reduction of a flyback power converter including a capacitor connected between an output and a ground for supplying a load current and an output feedback circuit for output feedback, the apparatus comprising:
   a shunt regulator connected to the output feedback circuit, operative to provide a reference voltage;
   a voltage divider connected to the output and the shunt regulator, for determining an output voltage at the output of the flyback power converter according to a voltage dividing ratio of the voltage divider;
   a switch-resistor network connected in parallel to a resistor in the voltage divider, including a switch controlled by a sleep mode signal to switch the voltage dividing ratio;
   a current sense resistor in a current path of the load current to generate a current sense voltage; and
   a comparator connected to the current sense resistor, comparing the current sense voltage with a threshold value to assert the sleep mode signal.

2. The apparatus of claim 1, wherein the shunt regulator comprises:
   a bipolar junction transistor having a collector connected to the output feedback circuit; and
   an operational amplifier having a positive input connected to the voltage divider, a negative input connected to a voltage source, and an output connected to a base of the bipolar junction transistor.

3. An apparatus for standby power reduction of a flyback power converter including a capacitor connected between an output and a ground for supplying a load current and an output feedback circuit for output feedback, the apparatus comprising:
   a shunt regulator connected to the output feedback circuit, operative to provide a reference voltage;
   a voltage divider connected to the output and the shunt regulator, for determining an output voltage at the output of the flyback power converter according to a voltage dividing ratio of the voltage divider;
   a current sense resistor in a current path of the load current to generate a current sense voltage; and
   a comparator connected to the current sense resistor, comparing the current sense voltage with a threshold value to assert the sleep mode signal;
   wherein the shunt regulator is controlled by a sleep mode signal to switch the reference voltage.

4. The apparatus of claim 3, wherein the shunt regulator comprises:

a bipolar junction transistor having a collector connected to the output feedback circuit;

an operational amplifier having a positive input connected to the voltage divider, a negative input connected to a voltage source, and an output connected to a base of the bipolar junction transistor; and a switch connected to the voltage source, for being switched by the sleep mode signal to bypass the voltage source.

5. A method for standby power reduction of a flyback power converter including a capacitor connected between an output and a ground for supplying a load current and an output feedback circuit for output feedback, the method comprising the steps of:

providing a reference voltage;

determining an output voltage at the output of the flyback power converter according to the reference voltage and a voltage dividing ratio;

switching the voltage dividing ratio responsive to a sleep mode signal;

generating a current sense voltage by a current sense resistor in a current path of the load current; and comparing the current sense voltage with a threshold value to assert the sleep mode signal.

6. A method for standby power reduction of a flyback power converter including a capacitor connected between an output and a ground for supplying a load current and an output feedback circuit for output feedback, the method comprising the steps of:

providing a reference voltage;

determining an output voltage at the output of the flyback power converter according to the reference voltage and a voltage dividing ratio;

switching the reference voltage responsive to a sleep mode signal;

generating a current sense voltage by a current sense resistor in a current path of the load current; and comparing the current sense voltage with a threshold value to assert the sleep mode signal.

\* \* \* \* \*